US012636712B2

(12) United States Patent　　(10) Patent No.:　US 12,636,712 B2
Hecht　　(45) Date of Patent:　May 26, 2026

(54) REPLACEABLE CUTTING HEAD, TOOL HOLDER AND MORSE TAPER ROTARY CUTTING TOOL HAVING FASTENING MEMBER

(71) Applicant: ISCAR, LTD., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 826 days.

(21) Appl. No.: 18/051,552

(22) Filed: Nov. 1, 2022

(65) Prior Publication Data

US 2024/0139829 A1　　May 2, 2024

(51) Int. Cl.
| | |
|---|---|
| *B23C 5/10* | (2006.01) |
| *B23B 27/16* | (2006.01) |
| *B23B 31/11* | (2006.01) |
| *B23B 31/117* | (2006.01) |
| *B23D 77/00* | (2006.01) |

(52) U.S. Cl.
CPC ............ *B23B 31/117* (2013.01); *B23B 27/16* (2013.01); *B23B 31/1122* (2013.01); *B23C 5/10* (2013.01); *B23C 2210/02* (2013.01); *B23C 2240/32* (2013.01); *B23D 2277/02* (2013.01)

(58) Field of Classification Search
CPC ............ B23B 2240/00; B23B 2240/36; B23B 2240/04; B23D 2277/06; B23C 2240/00; B23C 2240/04
See application file for complete search history.

(56) References Cited

U.S. PATENT DOCUMENTS

| | | | |
|---|---|---|---|
| 2,407,471 | A | 9/1946 | Burk |
| 7,004,692 | B2 | 2/2006 | Hecht |
| 7,431,543 | B2 | 10/2008 | Buettiker et al. |
| 7,775,751 | B2 | 8/2010 | Hecht et al. |
| 8,596,937 | B2 | 12/2013 | Hecht |
| 8,628,281 | B2 | 1/2014 | Azegami et al. |
| 2020/0254545 | A1 | 8/2020 | Ning et al. |

FOREIGN PATENT DOCUMENTS

| | | |
|---|---|---|
| CN | 113523433 A | 10/2021 |
| EP | 2 719 488 A1 | 4/2014 |

OTHER PUBLICATIONS

International Search Report dated Feb. 7, 2024, issued in PCT counterpart application No. PCT/IL2023/051077.
Written Opinion dated Feb. 7, 2024, issued in PCT counterpart application No. PCT/IL2023/051077.

*Primary Examiner* — Alan Snyder
(74) *Attorney, Agent, or Firm* — Womble Bond Dickinson (US) LLP

(57)　　　ABSTRACT

A cutting tool includes a replaceable cutting head including a forward cutting portion and a rearward mounting portion and a head through hole extending therethrough. The mounting portion includes a male coupling member. The male coupling member includes a conically shaped head abutment surface. The cutting tool includes a female coupling member including a conically shaped forward holder abutment surface and an internal thread. The cutting tool includes a fastening member having an external thread. When the cutting tool is in a locked position, the male coupling member is removably retained in the female coupling member by the fastening member located in the head through hole, the fastening member external thread and the holder internal thread being threadingly engaged with each other. The head abutment surface abuts the forward holder abutment surface thereby forming a Morse taper coupling between the male and female coupling members.

30 Claims, 9 Drawing Sheets

REPLACEABLE CUTTING HEAD, TOOL HOLDER AND MORSE TAPER ROTARY CUTTING TOOL HAVING FASTENING MEMBER

FIELD OF THE INVENTION

The subject matter of the present application relates to rotary cutting tools of the type in which a replaceable cutting head, having a male coupling member, is removably retained in a female coupling member of a tool holder, by means of a friction-fit coupling mechanism. More particularly it pertains to such a tool where the coupling mechanism has a machine taper, and yet further in particular where the machine taper is of the Morse taper variety, and yet further still in particular where the coupling mechanism has an additional fastening member.

BACKGROUND OF THE INVENTION

Rotary cutting tools can be provided with a coupling mechanism for releasably retaining a replaceable cutting head within a tool holder by a fastening member. An example of such a rotary cutting tool is disclosed in, for example, U.S. Pat. No. 7,431,543, showing a machine reamer which includes a base and an interchangeable reamer head assembled on the base. The reamer head is clamped with a conical shoulder into a complementary face-side insert seat of the base by means of a tension rod to provide the necessary coaxiality. The tension rod has a complementary polygonal section extending through an axis-central polygonal opening of the indexable head, so that a good rotational catch is guaranteed.

Another example is U.S. Pat. No. 7,004,692 showing a cutting head, a screw member and a tool shank. The screw member is in threaded engagement with the tool shank. The cutting head is centered with respect to the tool shank with a conical portion of the cutting head located in a conical forward portion of the tool shank. The cutting head has a head bore having a plurality of locking wings and the screw member has a plurality of clamping wings. Rotational coupling between the cutting head and the screw member is obtained by the engagement of the clamping wings of the screw member and stoppers which protrude forwardly in the axial direction from the locking surfaces of the locking wings. That is to say, torque is transferred from the tool shank to the head via the clamping wings on the screw member.

Other rotary cutting tools can be provided with a friction-fit coupling mechanism of the Morse taper variety. An example of such a rotary cutting tool is disclosed in, for example, U.S. Pat. No. 2,407,471 A showing an adapter having a tool receiving socket and a rotary tool therefor having a tapered shank. The tapered shank ends with a tang which engages with a drift hole, and the facets eliminate the rotation of the tool within the socket. Typically, a hammer is used to tap the tapered shank into the tool receiving socket until they are retained by friction.

It is an object of the subject matter of the present application to provide a coupling mechanism of a replaceable cutting head in a tool holder which is suitable, in particular, for rotary cutting tools having a small outer cutting diameter.

SUMMARY OF THE INVENTION

In accordance with a first aspect of the subject matter of the present application there is provided a replaceable cutting head, for rotary cutting operations, having a head longitudinal axis, defining opposite forward and rearward directions, and opposite rotationally forward and rearward directions with the rotationally forward direction being the cutting direction, the replaceable cutting head comprising:

a forward portion forming a cutting portion and a rearward portion forming a mounting portion; and opposite head forward and rearward surfaces and a head peripheral surface extending therebetween, the head forward surface being located at the cutting portion and the head rear surface being located at the mounting portion;

a head through hole comprising a through hole peripheral surface which extends about a through hole central axis, and intersects the head forward and rearward surfaces; wherein:

the mounting portion comprises a male coupling member protruding rearwardly from a head base surface, the head base surface extending transversely with respect to the head longitudinal axis, and defining a boundary between the cutting portion and the mounting portion; and the male coupling member comprises a conically shaped head abutment surface, configured for a Morse taper coupling mechanism.

In accordance with a further aspect of the subject matter of the present application, there is also provided a tool holder, having a holder longitudinal axis, comprising a female coupling member extending rearwardly from a holder forward surface, the holder forward surface extending transversely with respect to the holder longitudinal axis, the female coupling member comprising:

a conically shaped forward holder abutment surface, configured for a Morse taper coupling mechanism; and a holder internal thread which is located rearward of the forward holder abutment surface.

In accordance with a yet further aspect of the subject matter of the present application, there is also provided a rotary cutting tool comprising:

a replaceable cutting head of the type described above;

a tool holder of the type described above; and a fastening member, elongated along a fastening member longitudinal axis, the fastening member comprising a fastening member clamping portion and a fastening member shank portion axially offset therefrom along the fastening member longitudinal axis, the fastening member clamping portion comprising a clamping surface which tapers inwardly in a direction from the fastening member clamping portion towards the fastening member shank portion, the fastening member shank portion comprising a fastening member external thread; wherein:

the rotary cutting tool is adjustable between a released position and a locked position, wherein in the locked position:

the male coupling member is removably retained in the female coupling member by the fastening member located in the head through hole, the fastening member external thread and the holder internal thread being threadingly engaged with each other; and the head abutment surface abuts the forward holder abutment surface, thereby forming a Morse taper coupling between the male and female coupling members.

It is understood that the above-said is a summary, and that features described hereinafter may be applicable in any combination to the subject matter of the present application, for example, any of the following features may be applicable to the replaceable cutting head, the tool holder or the rotary cutting tool:

The head abutment surface can taper inwardly in the rearward direction at a head cone angle. The head cone angle can be in the range of 2.8°≤2α≤3.16°.

In particular, the head cone angle can be in the range of 2.9°≤2α≤3.06°.

The head through hole can comprise a clamping portion receiving portion and a shank portion receiving portion axially offset therefrom, the shank portion receiving portion extending between the clamping portion receiving portion and the head rearward surface. The clamping portion receiving portion can comprise at least one bearing surface tapering inwardly in the rearward direction.

The clamping portion receiving portion can extend to the head forward surface.

The head through hole can comprise at least two radially extending through hole widenings extending from the head rearward surface to the clamping portion receiving portion.

The clamping portion receiving portion can comprise at least two clamping wing pockets, each clamping wing pocket merging with a respective through hole radial widening and being rotationally forward therefrom about the head longitudinal axis. The clamping portion receiving portion can comprise at least two bearing surfaces, each bearing surface being formed from a portion of a respective clamping wing pocket.

The head through hole can comprise exactly two through hole widenings diametrically opposed to each other about the through hole central axis. The clamping portion receiving portion can comprise exactly two clamping wing pockets diametrically opposed to each other about the through hole central axis.

The head abutment surface has a head cone height as measured in a direction along the head longitudinal axis. The head abutment surface has a maximum head cone diameter. The head cone height can be greater than the maximum head cone diameter.

In particular, the head cone height can be greater than 1.5 times the maximum head cone diameter.

The mounting portion has a mounting portion height as measured between the head rearward surface and the head base surface in the direction along the head longitudinal axis. The head cone height can be greater than 80% of the mounting portion height.

The cutting portion has a cutting portion height as measured between the head forward surface and the head base surface in the direction along the head longitudinal axis. The mounting portion height can be greater than the cutting portion height.

The mounting portion height can be greater than twice the cutting portion height.

The male coupling member can be devoid of an external thread and a tang and a square drive.

The at least one bearing surface can be located entirely forward of the head base surface.

The forward holder abutment surface can taper inwardly towards the holder internal thread, at a holder cone angle. The holder cone angle can be in the range of 2.8°≤2γ≤3.16°.

In particular, the holder cone angle can be in the range of 2.9°≤2γ≤3.06°.

The tool holder can comprise a holder peripheral surface extending about the holder longitudinal axis and delimiting a boundary of the holder forward surface. The tool holder can comprise a coolant channel opening out to the holder peripheral surface.

The holder peripheral surface can comprise a forward holder peripheral surface and a rearward holder peripheral surface and an intermediate holder peripheral surface extending therebetween, the forward holder peripheral surface being closer to the holder forward surface than both the intermediate holder peripheral surface and the rearward holder peripheral surface. The forward holder peripheral surface has a diameter which can be less than the diameter of the rearward holder peripheral surface. The coolant channel can open out at least partially to the intermediate holder peripheral surface.

The tool holder can further comprise a rearward supporting portion having a rearward holder abutment surface which extends about the holder longitudinal axis.

The forward holder abutment surface has a holder cone height as measured in a direction along the holder longitudinal axis. The forward holder abutment surface has a maximum holder cone diameter. The holder cone height can be greater than the maximum holder cone diameter.

In particular, the holder cone height can be greater than 1.5 times the maximum holder cone diameter.

The holder internal thread has an internal thread length as measured in the direction along the holder longitudinal axis. The internal thread length can be less than the holder cone height.

In the locked position, the at least one clamping surface can abut the at least one bearing surface.

The fastening member can be integrally formed, having a unitary one-piece construction.

In the locked position, the head base surface can be spaced apart from the holder forward surface.

The rotary cutting tool can be a reamer.

The head through hole can comprise at least two through hole widenings extending from the head rearward surface to the clamping portion receiving portion. The clamping portion receiving portion can comprise at least two clamping wing pockets, each clamping wing pocket merging with a respective through hole radial widening and being rotationally forward therefrom about the head longitudinal axis. The clamping portion receiving portion can comprise at least two bearing surfaces, each bearing surface being formed from a portion of a respective clamping wing pocket. The fastening member clamping portion can comprise at least two fastening member clamping wings which extend radially outwardly with respect to the fastening member longitudinal axis. The fastening member clamping portion can comprise at least two clamping surfaces, each clamping surface being formed from a portion of a respective fastening member clamping wings. Each of the at least two fastening member clamping wings can be located in a respective clamping wing pocket. In the locked position, each of the at least two clamping surfaces can abut a respective bearing surface.

Each of the at least two clamping wing pockets can comprise a pocket side surface which extends radially with respect to the holder longitudinal axis and faces in the rotationally rearward direction. Each of the at least two fastening member clamping wings can comprise two opposite wing side surfaces which extend radially with respect to the fastening member longitudinal axis. In the locked position, for any and all fastening member clamping wings, one of the two opposite wing side surfaces can face in the rotationally forward direction. Also, in the locked position, each rotationally rearward facing pocket side surface of the at least two clamping wing pockets can abut a respective rotationally forward facing wing side surface.

The fastening member shank portion can comprise an elongated fastening member neck portion extending between the fastening member clamping portion and the fastening member external thread. The fastening member neck portion has a fastening member neck height as measured in a direction along the fastening member longitudinal axis. The fastening member external thread has an external thread length as measured in the direction along the fastening member longitudinal axis. The fastening member neck height can be greater than the external thread length.

The head through hole can comprise exactly two through hole widenings diametrically opposed to each other about the through hole central axis. The clamping portion receiving portion can comprise exactly two clamping wing pockets diametrically opposed to each other about the through hole central axis. The fastening member clamping portion can comprise exactly two fastening member clamping wings, diametrically opposed to each other about the fastening member longitudinal axis.

The tool holder can further comprise a rearward supporting portion having a rearward holder abutment surface which extends about the holder longitudinal axis. The fastening member shank portion can comprise at least two fastening member resilient pins angularly spaced apart about the fastening member longitudinal axis, the at least two fastening member resilient pins being flexible in a radial direction and located further from the fastening member clamping portion than the fastening member external thread. In the locked position, the at least two fastening member resilient pins can be elastically deformed against the rearward holder abutment surface.

BRIEF DESCRIPTION OF THE FIGURES

For a better understanding of the present application and to show how the same may be carried out in practice, reference will now be made to the accompanying drawings, in which.

6

Figures 1, 2:
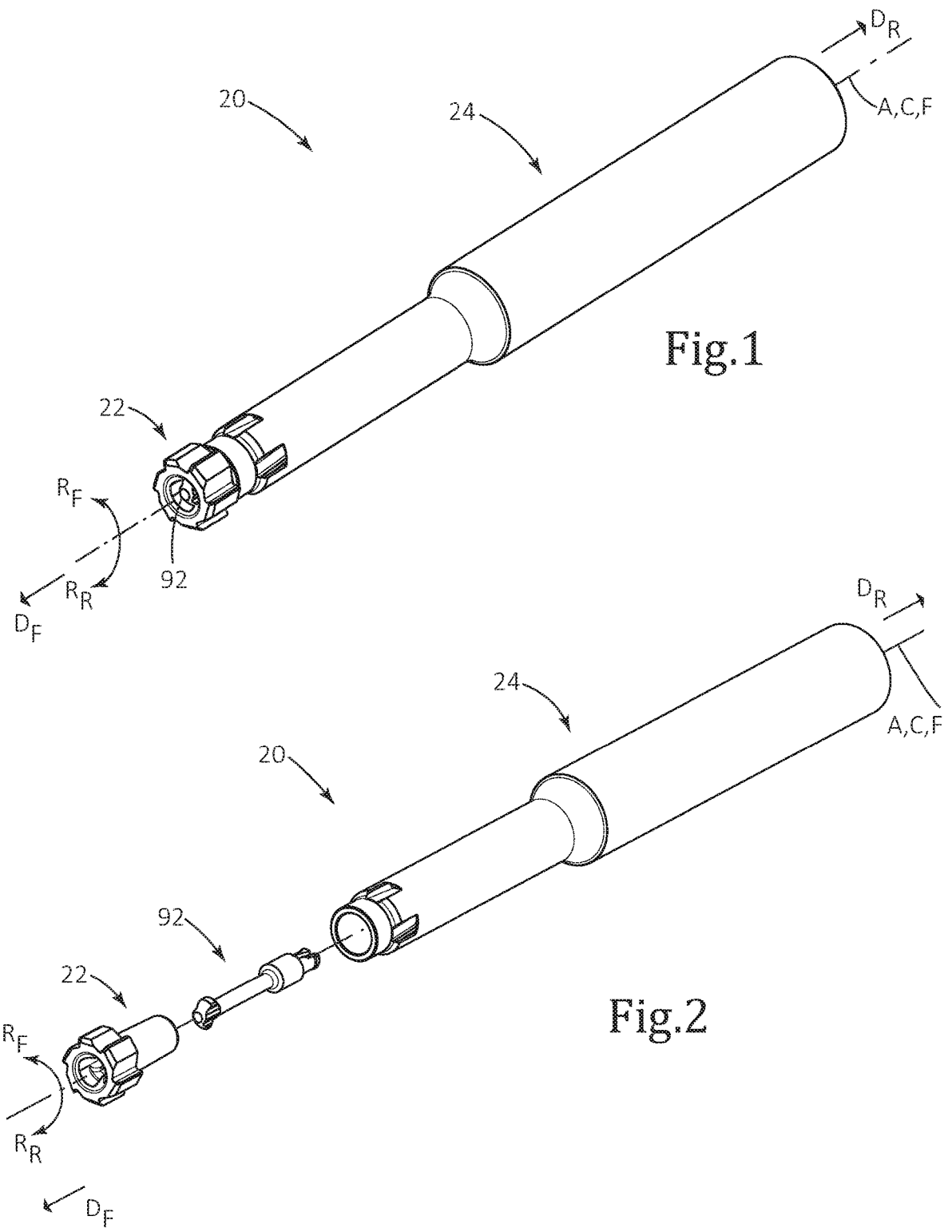
FIG. 1 is a perspective view of a rotary cutting tool.
FIG. 2 is an exploded perspective view of the rotary cutting tool shown in FIG. 1.
Figure 13:
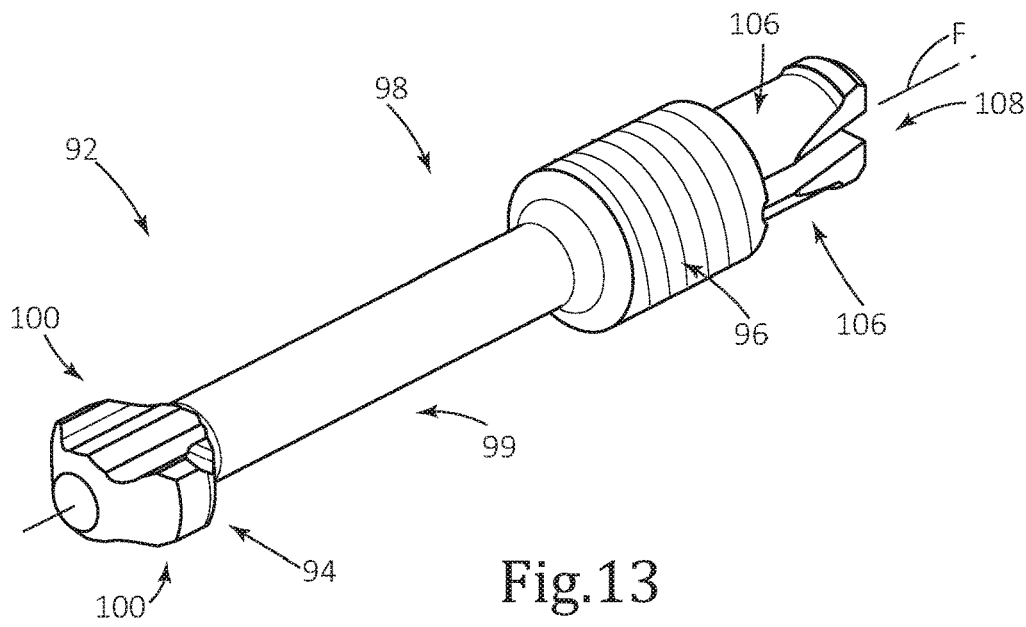
FIG. 13 is a perspective view of a fastening member shown in FIGS. 1 and 2.
Figure 14:
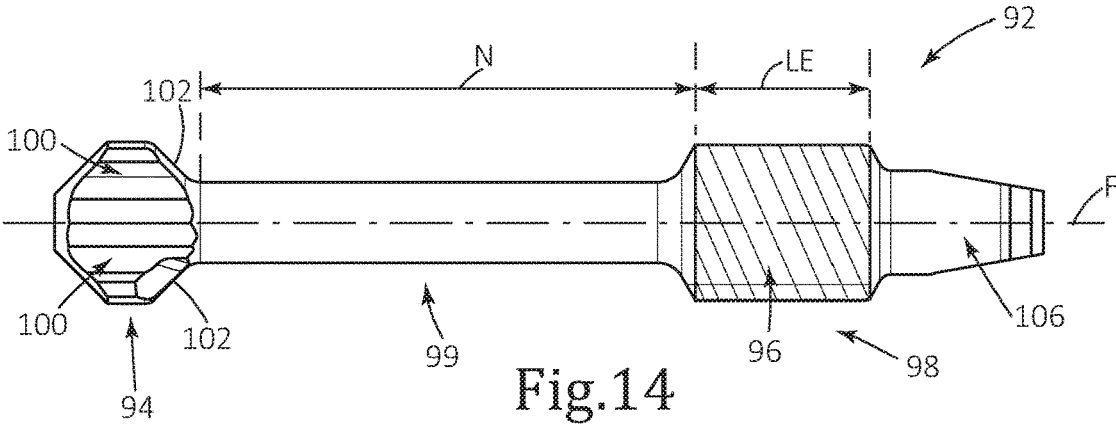
FIG. 14 is a side view of the fastening member shown in FIG. 13.
Figure 15:
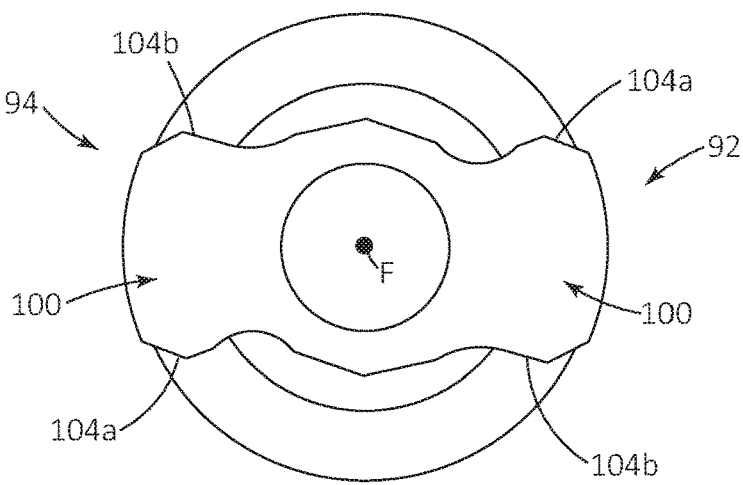
Figure 16:
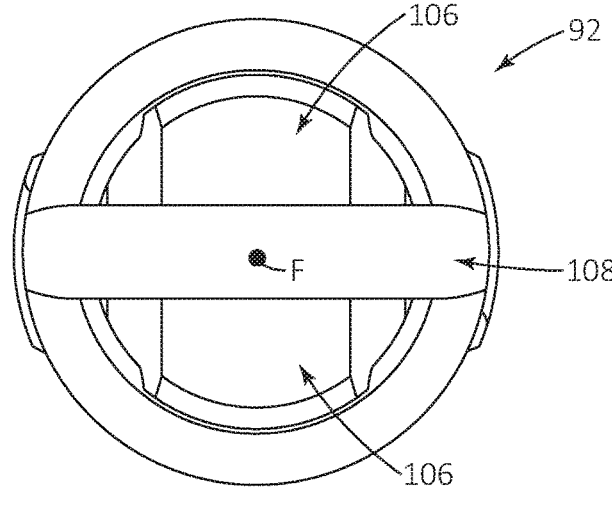
Figure 17:
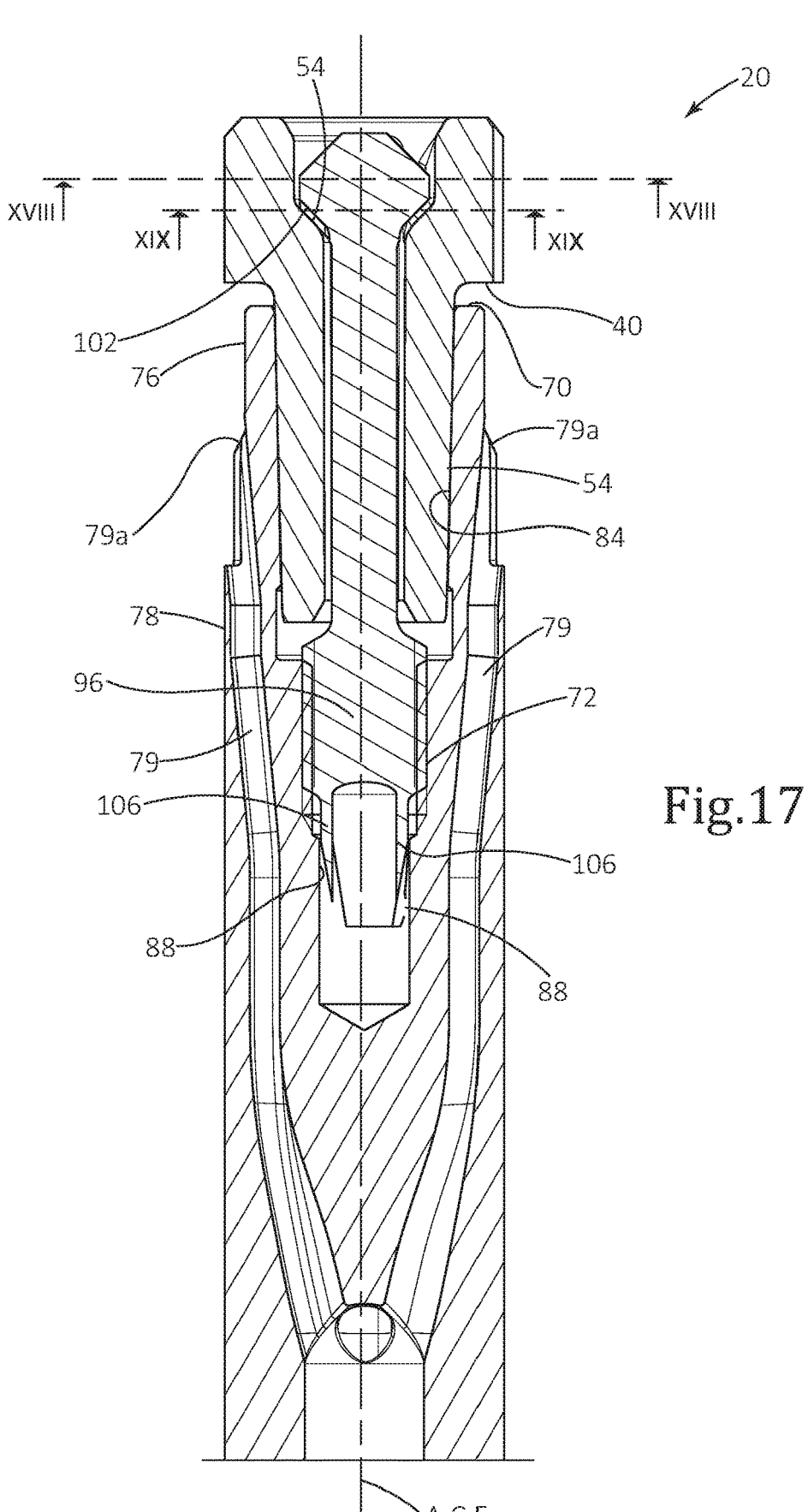
Figure 18:
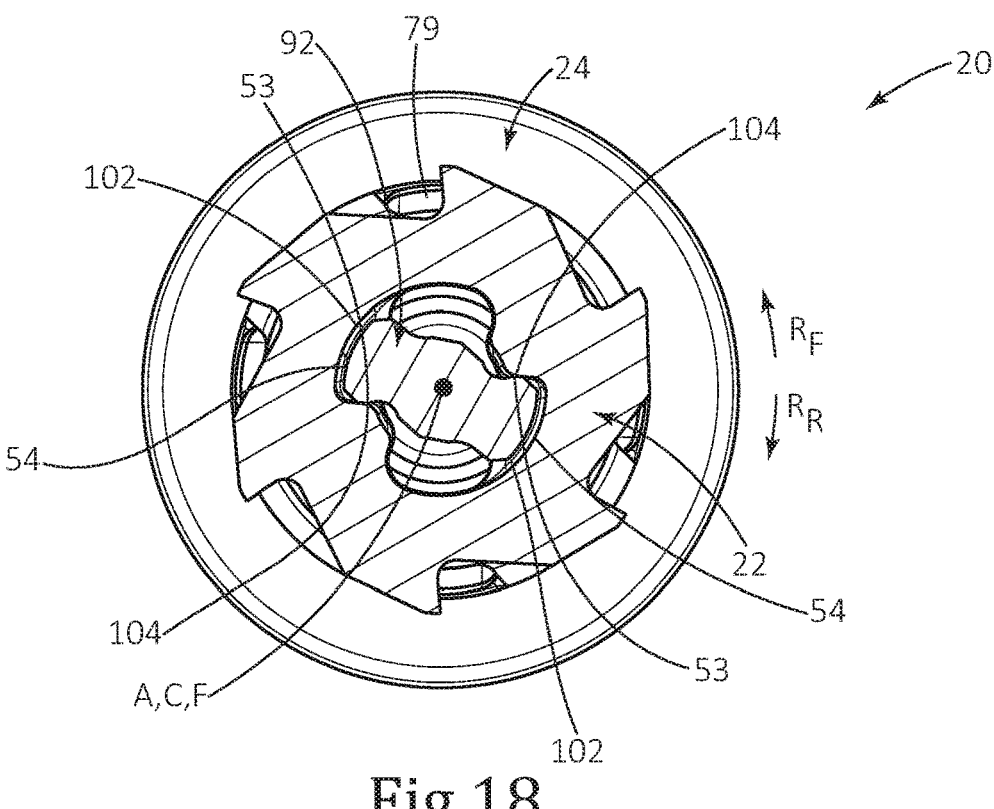
Figure 19:
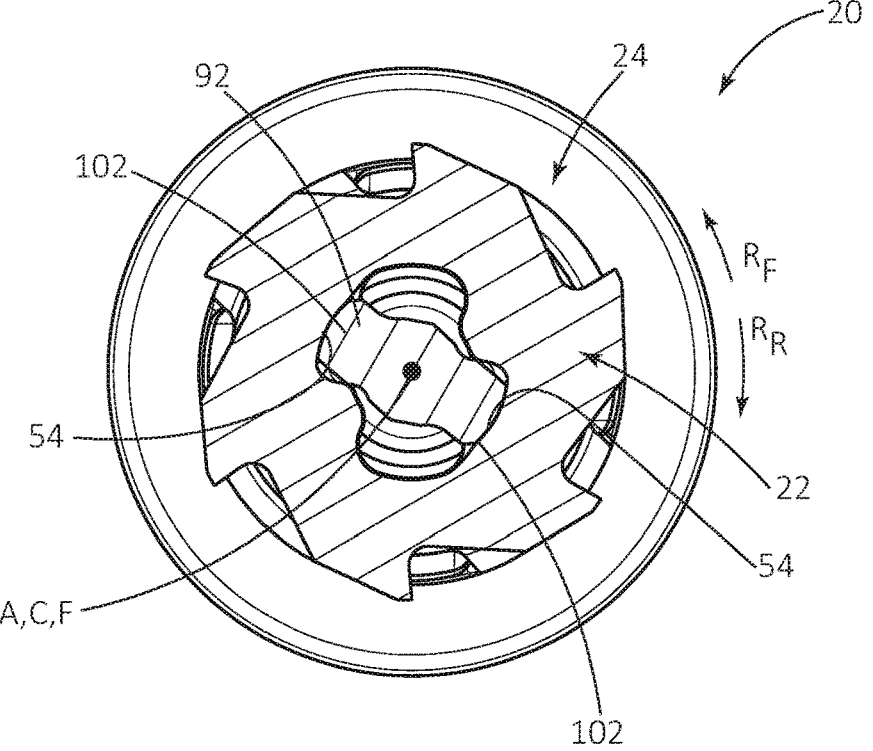

FIG. 15 is a top view of the fastening member shown in FIG. 13;

FIG. 16 is a bottom view of the fastening member shown in FIG. 13;

FIG. 17 is a detailed longitudinal cross-sectional view of the rotary cutting tool shown in FIGS. 1 and 2, when the rotary cutting tool is in a locked position;

FIG. 18 is a radial cross-sectional view of the rotary cutting tool shown in FIGS. 1 and 2 taken along the line XVIII-XVIII in FIG. 17; and FIG. 19 is a radial cross-sectional view of the rotary cutting tool shown in FIGS. 1 and 2 taken along the line XIX-XIX in FIG. 17.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Attention is first drawn to FIGS. 1 and 2 showing a rotary cutting tool 20 of the type used for reaming operations, in accordance with embodiments of the subject matter of the present application. The rotary cutting tool 20 includes a replaceable cutting head 22 that has a head longitudinal axis A, around which the replaceable cutting head 22 rotates defining opposite rotationally forward and rearward directions $R_F$, $R_R$. The rotationally forward direction $R_F$ is the cutting direction. The head longitudinal axis A also defines opposite forward and rearward directions $D_F$, $D_R$. Stated differently, the head longitudinal axis A extends in a forward $D_F$ to rearward direction $D_R$. The replaceable cutting head 22 can be typically made from cemented carbide. The rotary cutting tool 20 also includes a tool holder 24. The tool holder 24 can be typically made from steel. The replaceable cutting head 22 can be removably retained in the tool holder 24 by means of a friction-fit coupling mechanism and a fastening member. Such couplings could possibly be advantageous for other types of rotary cutting operations than that stated hereinabove, such as, for example, milling or drilling.

Figure 4:
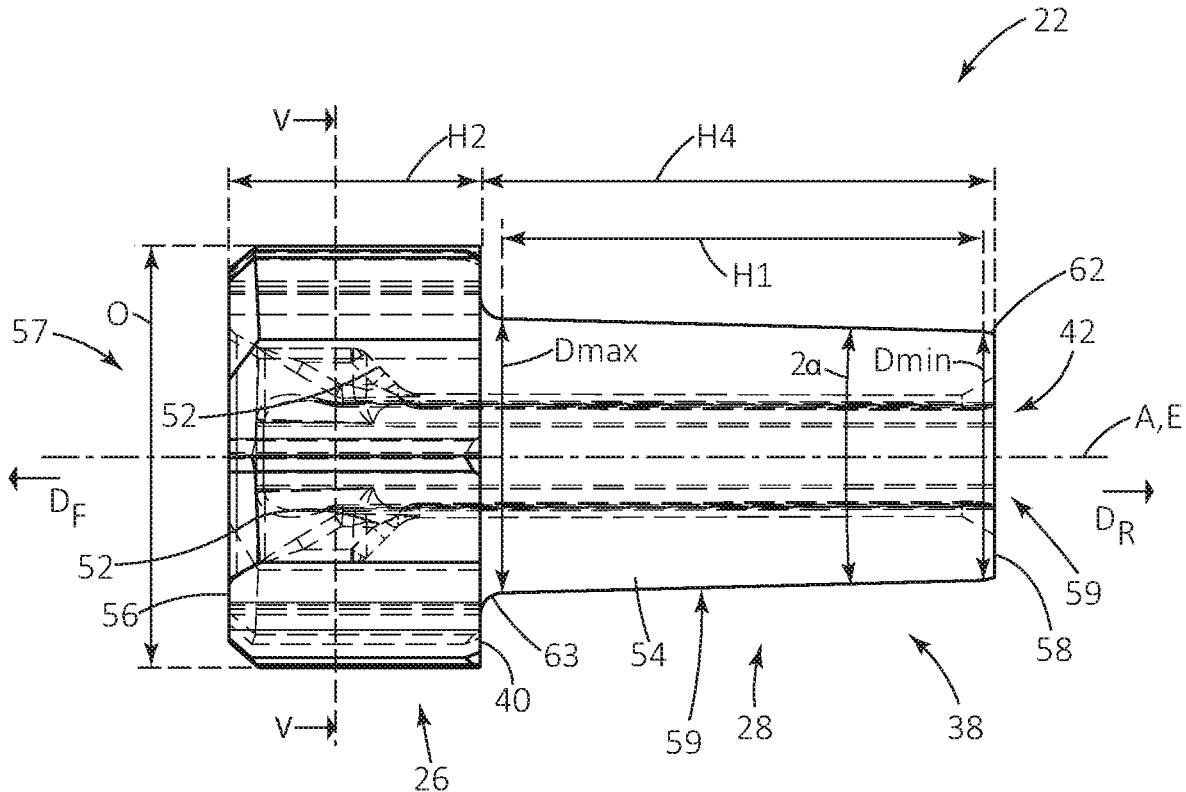
FIG. 4 is a side view of the replaceable cutting head shown in FIG. 3, showing a hidden head through hole.
Figure 7:
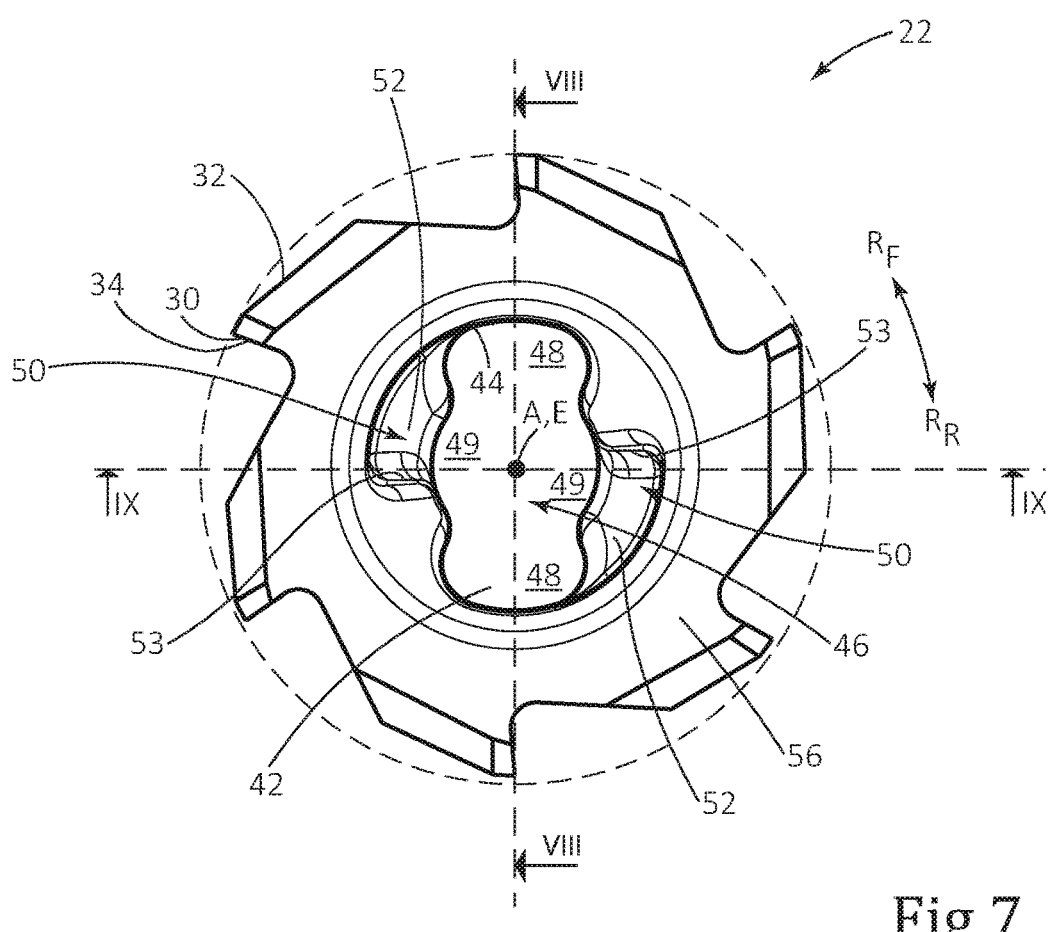
FIG. 7 is a forward view of the replaceable cutting head shown in FIG. 3.
Figure 8:
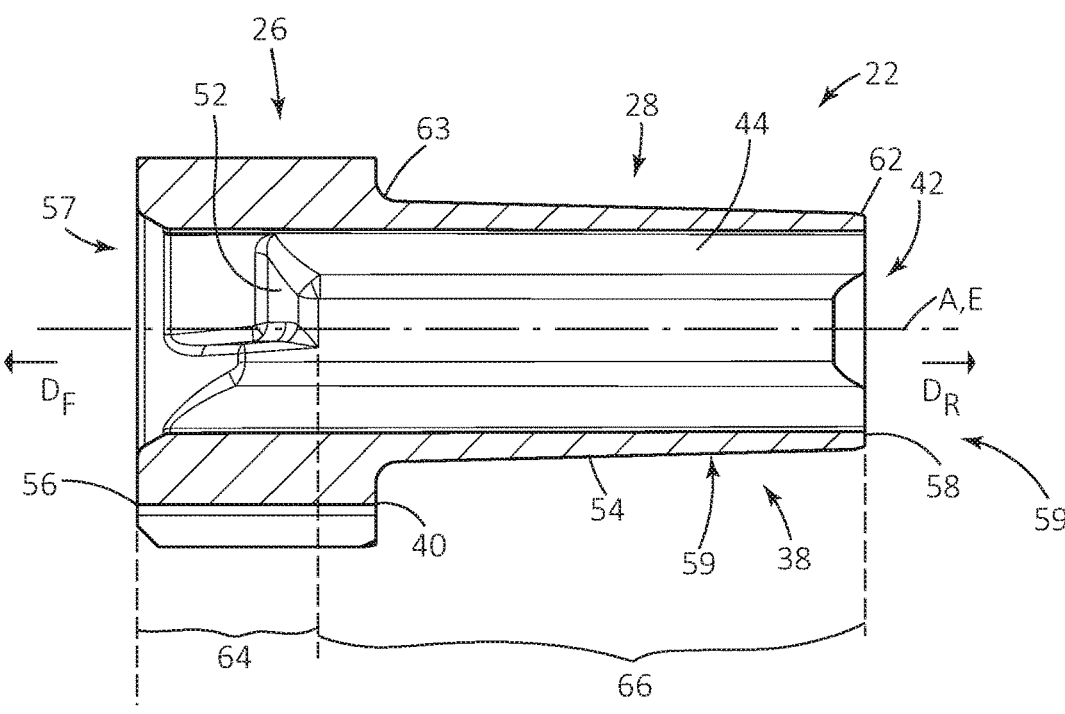
FIG. 8 is a cross-sectional view of the replaceable cutting head taken along the line VIII-VIII in FIG. 7.
Figures 9, 10:
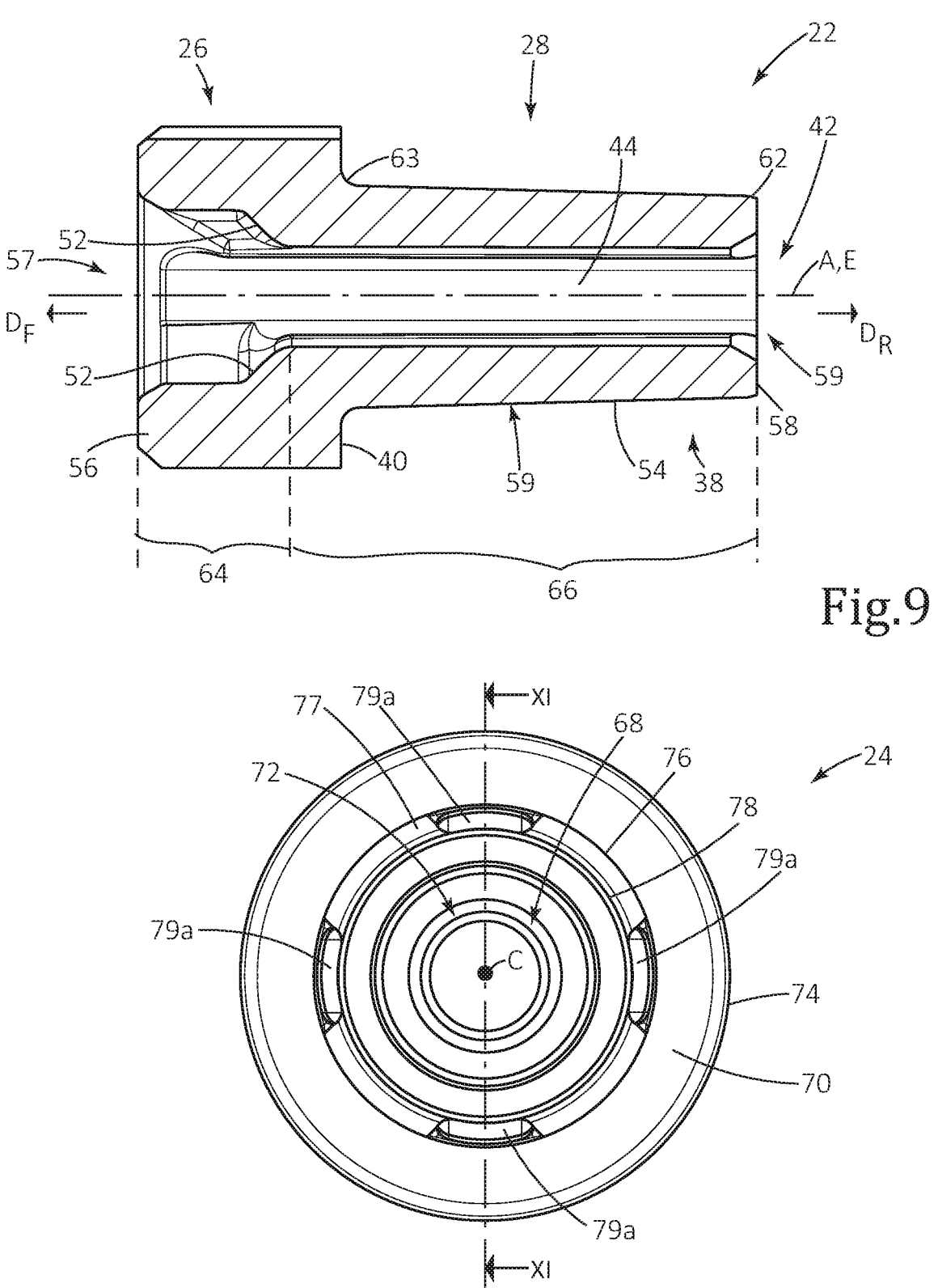
FIG. 9 is a cross-sectional view of the replaceable cutting head taken along the line IX-IX in FIG. 7.
FIG. 10 is a top view of a tool holder shown in FIGS. 1 and 2.

It should be appreciated that use of the terms "forward" and "rearward" throughout the description and claims refer to a relative position in a direction of the head longitudinal axis A towards the left and right, respectively, in FIGS. 4, 8 and 9. It should be further appreciated that use of the terms "rotationally forward" and "rotationally rearward" throughout the description and claims refer to a relative position in a rotational direction about the head longitudinal axis A counter-clockwise and clockwise, respectively, in FIGS. 5 and 7.

Reference is now made to FIGS. 3 to 9. The replaceable cutting head 22 has a forward portion that forms a cutting portion 26 and a rearward portion that forms a mounting portion 28. That is to say, the cutting portion 26 is forwardly disposed and the mounting portion 28 is rearwardly disposed. In accordance with some embodiments of the subject matter of the present application, the cutting portion 26 can adjoin the mounting portion 28.

The replaceable cutting head 22 includes opposite head forward and rearward surfaces 56, 58 and a head peripheral surface 60 extending therebetween. The head forward surface 56 is located at the cutting portion 26 and faces generally in the forward direction $D_F$. The head rearward surface 58 is located at the mounting portion 28 and faces generally in the rearward direction $D_R$. The head peripheral surface 60 extends about the head longitudinal axis A. In accordance with some embodiments of the subject matter of the present application, the head rearward surface 58 can be perpendicular to the head longitudinal axis A.

In accordance with some embodiments of the subject matter of the present application the replaceable cutting head 22 can be integrally formed to have unitary one-piece construction. This provides an advantage in that the replaceable cutting head 22 has no detachable cutting inserts (not shown). Such detachable cutting inserts need to be replaced periodically and this can be a time consuming procedure. There is also a possibility that threaded screws (not shown), for example, which can be used to releasably retain the detachable cutting inserts to the replaceable cutting head 22 can be mislaid and/or lost during the replacement operation.

Figure 3:
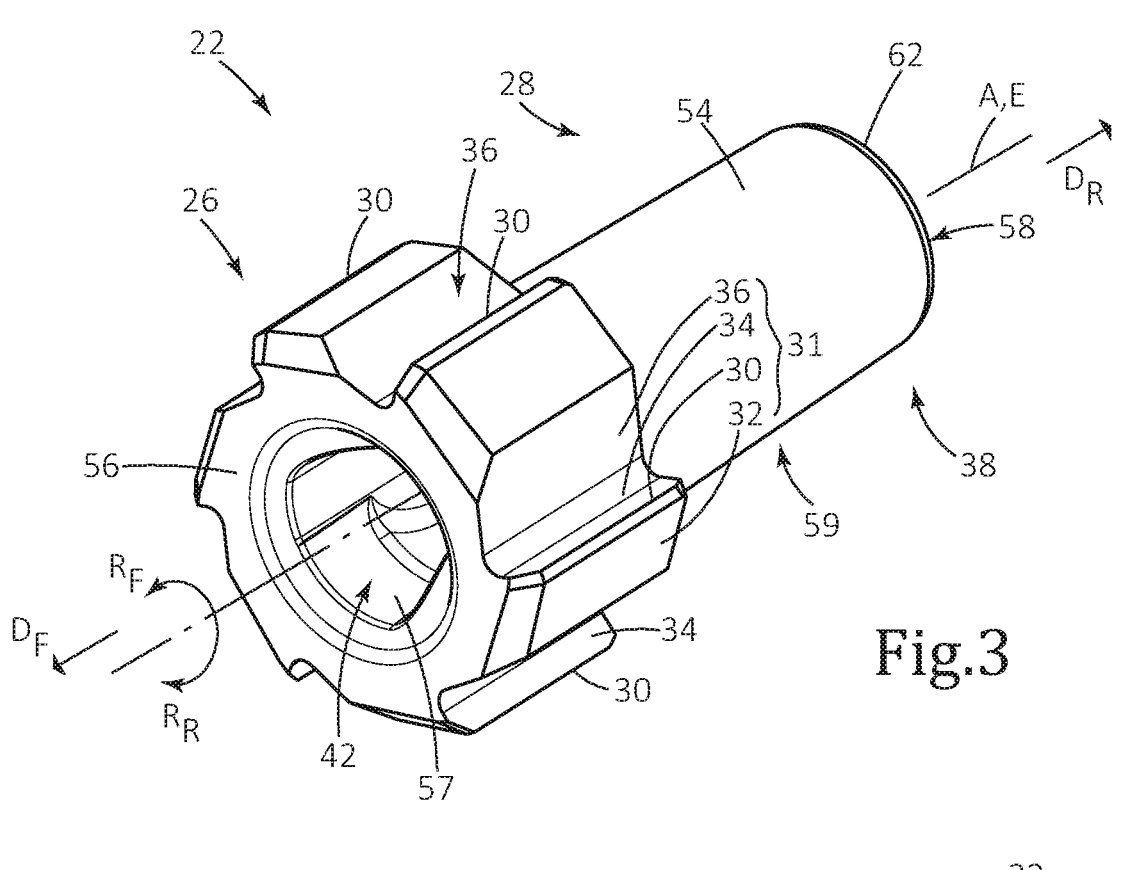
FIG. 3 is a perspective view of a replaceable cutting head shown in FIGS. 1 and 2.

Referring to FIG. 3, the cutting portion 26 includes at least one peripheral cutting edge 30. In this non-limiting example shown in the drawings, there can be exactly six peripheral cutting edges. The peripheral cutting edges 30 define an outer cutting diameter O. The outer cutting diameter O can be equal to or less than 7.6 mm. Each peripheral cutting edge 30 is formed at the intersection of a peripheral relief surface 32, and a peripheral rake surface 34. The peripheral relief surface 32 is located rotationally rearward of (i.e., behind) the peripheral cutting edge 30 and the peripheral rake surface 34 is located rotationally forward of (i.e., ahead) of the peripheral cutting edge 30. Generally speaking, the peripheral rake surface 34 faces in the rotationally forward direction $R_F$. The orientation of the peripheral cutting edge 30 (and the peripheral rake and relief surfaces 34, 32) allows metal cutting operations to be performed. In accordance with some embodiments of the subject matter of the present application the cutting portion 26 can include at least one flute 36 for evacuating chips (not shown) that are produced during the cutting operation. One flute 36 is associated with each peripheral cutting edge 30. As seen in the figures, the cutting portion 26 includes a plurality circumferentially arranged cutting sections 31, each cutting section 31 including in the rotationally forward direction $R_F$, a trailing relief surface 32, a cutting edge 30, a rake surface 34 and a flute 36, one after another.

Making reference in particular to FIG. 4, the mounting portion 28 includes a male coupling member 38 that protrudes rearwardly from a head base surface 40. The head base surface 40 extends transversely with respect to the head longitudinal axis A and defines a boundary between the cutting portion 26 and the mounting portion 28. That is to say, the cutting portion 26 is formed forward of the head base surface 40 and the mounting portion 28 is formed rearward of the head base surface 40. In accordance with some embodiments of the subject matter of the present application the male coupling member 38 can be rigid. The head base surface 40 can be perpendicular to the head longitudinal axis A. It is noted that the male coupling member 38 can be delimited in the rearward direction $D_R$ by the head rearward surface 58. The male coupling member 38 can be devoid of an external thread and a tang and a square drive. Additionally, the male coupling member 38 can be devoid of a pull stud.

Referring again to FIG. 4, the cutting portion 26 has a cutting portion height H2 as measured between the head forward surface 56 and the head base surface 40 in a direction along the head longitudinal axis A. The mounting portion 28 has a mounting portion height H4 as measured between the head rearward surface 58 and the head base surface 40 in the direction along the head longitudinal axis A. In accordance with some embodiments of the subject matter of the present application, the mounting portion height H4 can be greater than the cutting portion height H2. Preferably, the mounting portion height H4 can be greater than twice the cutting portion height H2.

The male coupling member 38 includes a circumferentially extending head abutment surface 54 that extends about the head longitudinal axis A. The head abutment surface 54 faces radially outwardly. The head abutment surface 54 tapers inwardly in the rearward direction $D_R$ at a head cone angle $2\alpha$. That is to say, the head abutment surface 54 has a conical shape facing radially outwards, where the head cone angle $2\alpha$ is an internal angle. The head abutment surface 54 is configured for a Morse taper coupling mechanism. In accordance with some embodiments of the subject matter of the present application, the head abutment surface 54 can be frusto-conical. The head cone angle $2\alpha$ can be in the range of $2.8°\leq2\alpha\leq3.16°$ (i.e., typical Morse taper cone angles). Preferably, the head cone angle $2\alpha$ can be in the range of $2.9°\leq2\alpha\leq3.06°$. Stated differently, head abutment surface 54 can define a taper angle $\alpha$ which is in the range of $1.45°\leq\alpha\leq1.53°$ with respect to the head longitudinal axis A (the taper angle $\alpha$ being half the cone angle $2\alpha$). In some embodiments, the head cone angle $2\alpha$ can be equal to $2.98°$. It is noted that the head abutment surface 54 is intended to abut a corresponding surface on the tool holder 24 when the rotary cutting tool 20 is in a locked position, as will be described hereinafter.

It should be appreciated that use of the terms "radially inward/inwardly" and "radially outward/outwardly" throughout the description and claims refer to a relative position in a perpendicular direction in relation to the head longitudinal axis A and/or holder longitudinal axis C, towards and away from the respective axis, in FIGS. 4 to 9, and 10 to 12. It should further be appreciated that use of the term "cone angle" throughout the description refers to an angle formed by the tapered surfaces of a cone, in a longitudinal cross-section. It is noted that the term "longitudinal cross-section" refers to a cross-section taken in a plane containing the longitudinal axis.

The conically shaped head abutment surface 54 has a maximum head cone diameter $D_{max}$, which is the largest diameter of the conically shaped head abutment surface 54. The conically shaped head abutment surface 54 has a minimum head cone diameter $D_{min}$, which is the smallest diameter of the conically shaped head abutment surface 54.

Referring to FIGS. 4, 8 and 9, in accordance with some embodiments of the subject matter of the present application, the head abutment surface 54 can intersect the head rearward surface 58 via a head chamfered surface 62, forming a chamfered corner. That is to say, the head chamfered surface 62 can extend between, and adjoin, the head abutment surface 54 and the head rearward surface 58.

In accordance with some embodiments of the subject matter of the present application, the head abutment surface 54 can intersect the head base surface 40 via a head fillet surface 63, forming a concave filleted corner. That is to say, the head fillet surface 63 can extend between, and adjoin, the head abutment surface 54 and the head base surface 40.

The head abutment surface 54 has a head cone height H1, as measured in the direction along the head longitudinal axis A. In accordance with some embodiments of the subject matter of the present application, the head cone height H1 can be greater than the maximum head cone diameter $D_{max}$. In particular, the head cone height H1 can be greater than 1.5 times the maximum head cone diameter $D_{max}$. Thus, the tapered contact area between the male coupling member and the female coupling member is greater compared with other known tapered couplings such as the one disclosed in U.S. Pat. No. 7,004,692. The head cone height H1 can be less than times the maximum head cone diameter $D_{max}$. In particular, the head cone height H1 can be less than 2.5 times the maximum head cone diameter $D_{max}$. The head cone height H1 can be greater than 80% of the mounting portion height H4. The head cone height H1 can be greater than the outer cutting diameter O.

Referring in general to FIGS. 2-9, the replaceable cutting head 22 includes a head through hole 42, which extends through the cutting and mounting portions 26, 28. In FIG. 4, the head through hole 42 is hidden and is thus indicated by dashed lines. The head through hole 42 is configured for a fastening member to be inserted therethrough, as described later in the description. The head through hole 42 includes a through hole peripheral surface 44 which extends about a through hole central axis E. Generally speaking, the through hole peripheral surface 44 faces towards the through hole central axis E. The through hole peripheral surface 44 intersects the head forward and rearward surfaces 56, 58. That is to say, the head through hole 42 opens out to the head forward and rearward surfaces 56, 58 (at head forward and rearward hole openings 57, 59, respectively). In accordance with some embodiments of the subject matter of the present application, the head forward and rearward hole openings 57, 59 can be intersected by the head longitudinal axis A. The through hole central axis E can be co-incident with the head longitudinal axis A. It is noted that the head through hole 42 can be devoid of an internal thread.

In accordance with some embodiments of the subject matter of the present application, the head through hole 42 can include a clamping portion receiving portion 64 and a shank portion receiving portion 66. The shank portion receiving portion 66 is axially offset (along the head longitudinal axis A) from the clamping portion receiving portion 64. The shank portion receiving portion 66 can extend between the clamping portion receiving portion 64 and the head rearward surface 58. The clamping portion receiving portion 64 can extend to the head forward surface 56. The clamping portion receiving portion 64 can include at least one bearing surface 52 which tapers (slopes) inwardly in the rearward direction $D_R$. Thus, the at least one bearing surface 52 faces radially inwardly. The shank portion receiving portion 66 can transition into the clamping portion receiving portion 64 in the forward direction $D_F$ at the at least one bearing surface 52. The at least one bearing surface 52 can be located entirely forward of the head base surface 40. That is to say, the at least one bearing surface 52 can be located entirely in the cutting portion 26.

Figure 5:
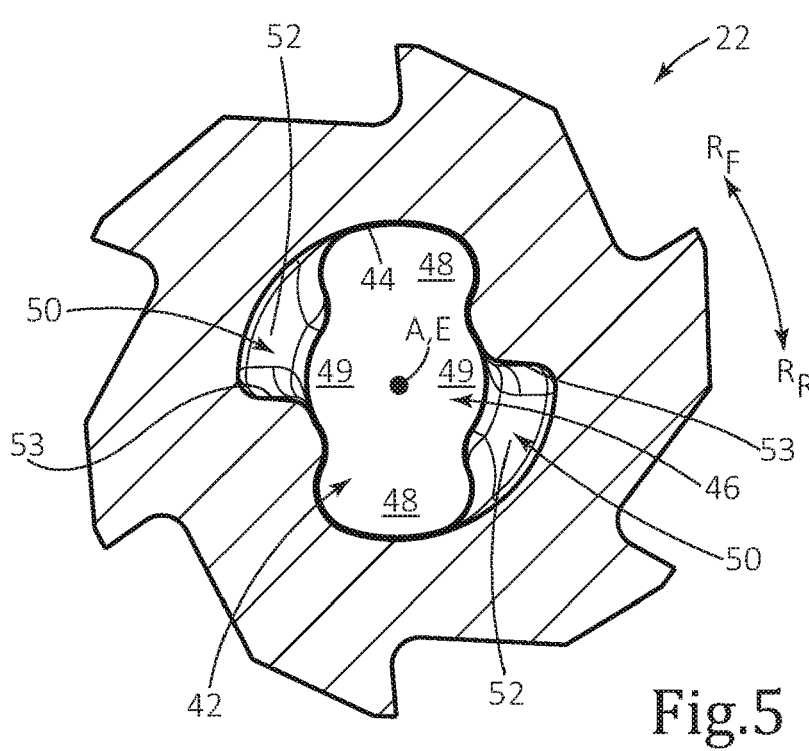
FIG. 5 is a cross-sectional view of the replaceable cutting head taken along the line V-V in FIG. 4.
Figure 6:
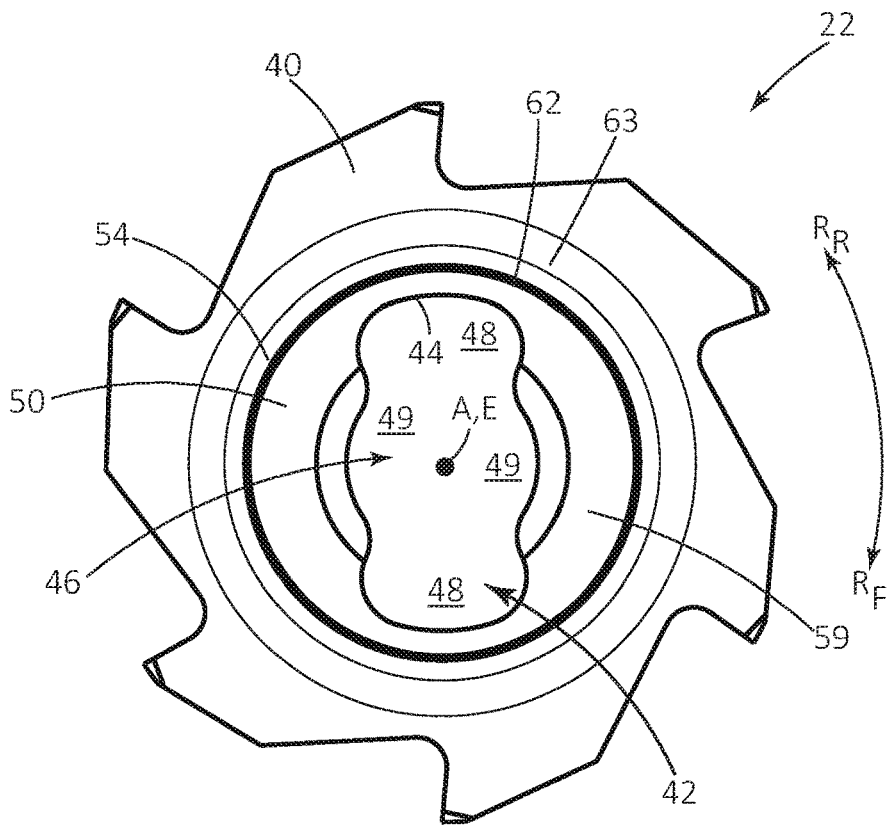
FIG. 6 is a rearward view of the replaceable cutting head shown in FIG. 3.

Referring to FIGS. 5-7, in accordance with some embodiments of the subject matter of the present application, the head through hole 42 can include a through hole central portion 46 which extends along the head longitudinal axis A between the head forward and rearward surfaces 56, 58. The head through hole 42 is non-cylindrical. That is to say, the head through hole 42 has a non-constant radial cross-section along the through hole central axis E. In particular, the head through hole 42 can include at least two radially extending through hole widenings 48 which extend from the head rearward surface 58 to the clamping portion receiving portion 64. The at least two through hole widenings 48 can extend to the head forward surface 56. The at least two through hole widenings 48 can merge with, and be disposed radially outwards from, the through hole central portion 46. The at least two through hole widenings 48 can be identical and have rotational symmetry, about the through hole central axis E. In this non-limiting example shown in the drawings the head through hole 42 includes exactly two through hole widenings 48 diametrically opposed to each other about the through hole central axis E. The head through hole 42 can also include at least two through hole narrowings 49 which extend from the head rearward surface 58 to the clamping portion receiving portion 64. Each pair of adjacent through hole narrowings 49 are angularly spaced apart by a respective through hole widening 48. The number of through hole narrowings 49 can match the number of through hole widenings 48. Thus, the two through hole narrowings 49 can be diametrically opposed to each other, with 180° rotational symmetry about the through hole central axis E.

Referring to FIGS. 5 and 7, in accordance with some embodiments of the subject matter of the present application, the clamping portion receiving portion 42 can include at least two clamping wing pockets 50. The at least two clamping wing pockets 50 are designed to receive a respective clamping wing of a fastening member 92 as described later in the description. The number of clamping wing pockets 50 can match the number of through hole widenings 48. The at least two clamping wing pockets 50 can merge with, and be disposed radially outwards from, the through hole central portion 46. Each clamping wing pocket 50 can merge with and extend rotationally forward from (about the head longitudinal axis A) a respective through hole radial widening 48. Each clamping wing pocket 50 can be angularly aligned with, and located axially forward of, a respective through hole narrowing 49. In this non-limiting example shown in the drawings, the head through hole 42 includes exactly two clamping wing pockets 50 diametrically opposed to each other, with 180° rotational symmetry about the through hole central axis E.

In accordance with some embodiments of the subject matter of the present application, each clamping wing pocket 50 can include a pocket side surface 53 which extends radially with respect to the holder longitudinal axis C. The pocket side surface 53 faces in the rotationally rearward direction $R_R$. The clamping portion receiving portion 64 can include at least two bearing surfaces 52, each bearing surface 52 being formed from a portion of a respective clamping wing pocket 50. Making reference again to FIGS. 5 and 7, each bearing surface 52 can extend from a respective pocket side surface 53 to an adjacent through hole widening 48. The at least two clamping wing pockets 50 can be identical and have rotational symmetry, about the through hole central axis E.

Figure 11:
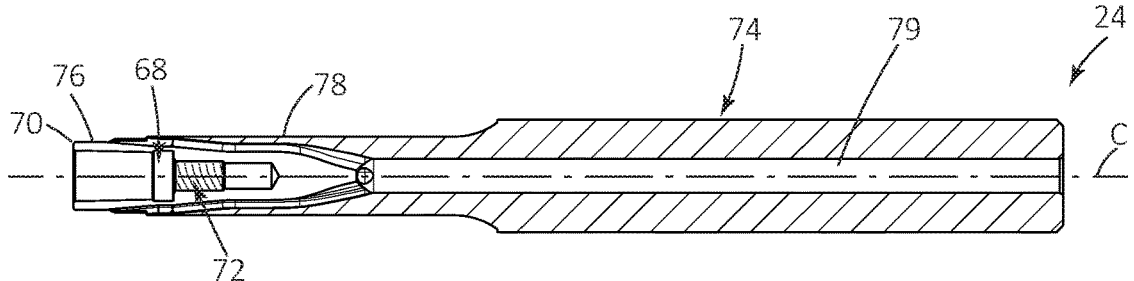
FIG. 11 is a cross-sectional view of the tool holder shown in taken along the line XI-XI in FIG. 10.
Figure 12:
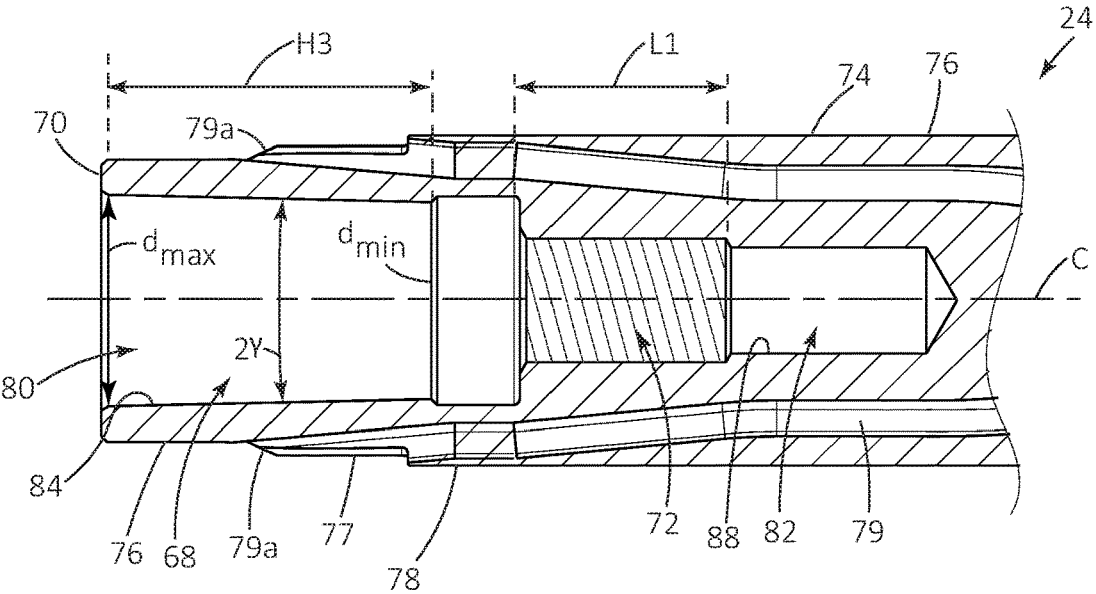
FIG. 12 is a detail of FIG. 11.

Another aspect of the subject matter of the present application relates to the tool holder 24. Referring now to FIGS. 10-12, the tool holder 24 has a holder longitudinal axis C. In accordance with some embodiments of the subject matter of the present application, the tool holder 24 can include a holder peripheral surface 74 which extends about the holder longitudinal axis C and delimits a boundary of a holder forward surface 70.

In accordance with some embodiments of the subject matter of the present application, the holder peripheral surface 74 can include a forward holder peripheral surface 76 and a rearward holder peripheral surface 78 and an intermediate holder peripheral surface 77 which extends therebetween. The forward holder peripheral surface 76 can be closer to the holder forward surface 70 than both the intermediate holder peripheral surface 77 and the rearward holder peripheral surface 78. The forward holder peripheral surface 76 and the rearward holder peripheral surface 78 lie on different imaginary co-axial cylinders. The forward holder peripheral surface 76 can have a diameter less than the diameter of the rearward holder peripheral surface 78. The intermediate holder peripheral surface 77 can slope radially outwardly from the forward holder peripheral surface 76 to the rearward holder peripheral surface 78.

Referring to FIG. 12, the tool holder 24 includes a female coupling member 68 that extends rearwardly from the holder forward surface 70. The holder forward surface 70 extends transversely with respect to the holder longitudinal axis C. In accordance with some embodiments of the subject matter of the present application the holder forward surface 70 can be perpendicular to the holder longitudinal axis C. The female coupling member 68 includes a holder internal thread 72 extending along the holder longitudinal axis C. The holder internal thread 72 has an internal thread length LI, measured in a direction of the holder longitudinal axis C.

The female coupling member 68 includes two supporting portions, a forward supporting portion 80 and a rearward supporting portion 82, the forward supporting portion 80 being located forward of the rearward supporting portion 82. The forward and rearward supporting portions 80, 82 are located either side of the holder internal thread 72. Stated differently, the holder internal thread 72 is located between the forward and rearward supporting portions 80, 82.

The forward supporting portion 80 includes a forward holder abutment surface 84 that extends about the holder longitudinal axis C. The forward holder abutment surface 84 is located forward of the holder internal thread 72 (stated differently, the holder internal thread 72 is located rearward of the forward holder abutment surface 84). The holder internal thread 72 is spaced apart from the holder forward surface 70 at least by the forward holder abutment surface 84. The forward holder abutment surface 84 faces inwardly with respect to the holder longitudinal axis C. The forward holder abutment surface 84 tapers inwardly in a (rearward) direction towards the holder internal thread 72 at a holder cone angle 2γ. That is to say, the forward holder abutment surface 84 has a conical shape facing radially inwards, where the holder cone angle 2γ is an external angle. The forward holder abutment surface 84 is configured for a Morse taper coupling mechanism. In accordance with some embodiments of the subject matter of the present application, the forward holder abutment surface 84 can be frusto-conical. The holder cone angle 2γ can be in the range of 2.8°≤2γ≤3.16°. Preferably, the holder cone angle 2γ can be in the range of 2.9°≤2γ≤3.06°. Stated differently, the forward holder abutment surface 84 can define a taper angle γ which is in the range of 1.45°≤γ≤1.53° with respect to the holder longitudinal axis C. In some embodiments, the holder cone angle 2γ can be equal to 2.98°.

Referring to FIG. 12, the conically shaped forward holder abutment surface 84 has a maximum holder cone diameter $d_{max}$, which is the largest diameter of the conically shaped forward holder abutment surface 84. The conically shaped forward holder abutment surface 84 has a minimum holder cone diameter $d_{min}$, which is the smallest diameter of the conically shaped forward holder abutment surface 84.

The forward holder abutment surface 84 has a holder cone height H3, as measured in a direction along the holder longitudinal axis C. The internal thread length LI can be less than the holder cone height H3. The holder cone height H3 can be greater than the maximum holder cone diameter $d_{max}$. In particular, the holder cone height H3 can be greater than 1.5 times the maximum holder cone diameter $d_{max}$. The holder cone height H3 can be less than 5 times the maximum holder cone diameter $d_{max}$. In particular, the holder cone height H3 can be less than 2.5 times the maximum holder cone diameter $d_{max}$.

In accordance with some embodiments of the subject matter of the present application, the rearward supporting portion 82 can include a rearward holder abutment surface 88 that extends about the holder longitudinal axis C. The rearward holder abutment surface 88 can be cylindrical.

In accordance with some embodiments of the subject matter of the present application, the tool holder 24 can include at least one coolant channel 79. The at least one coolant channel 79 can open out to the holder peripheral surface 74 at a coolant channel outlet 79a. The coolant channel outlet 79a is configured to direct coolant towards the peripheral cutting edges 30. Preferably, the at least one coolant channel 79 can open out at least partially to the intermediate holder peripheral surface 77. In this non-limiting example shown in the drawings, the tool holder 24 includes exactly four coolant channels 79 and exactly four coolant channel outlet 79a evenly distributed about the holder longitudinal axis C. The at least one coolant channel 79 can be spaced apart from the female member 68. At least a portion of the at least one coolant channel 79 can be radially outward of the female member 68.

Another aspect of the subject matter of the present application relates to a rotary cutting tool 20 that includes the replaceable cutting head 22 and tool holder 24 as defined herein above. Referring to FIG. 13-16, the rotary cutting tool 20 also includes a fastening member 92. The fastening member 92 is elongated along a fastening member longitudinal axis F. The fastening member 92 includes a fastening member clamping portion 94 and a fastening member shank portion 98. The fastening member clamping portion 94 and the fastening member shank portion 98 are axially offset from one another (with respect to the fastening member longitudinal axis F). In accordance with some embodiments of the subject matter of the present application, the fastening member 92 can be integrally formed, having a unitary one-piece construction. The fastening member 92 can be typically made from steel.

In accordance with some embodiments of the subject matter of the present application, the fastening member clamping portion 94 can include a clamping surface 102 which tapers (slopes) inwardly in a direction from the fastening member clamping portion 94 towards the fastening member shank portion 98. Thus, the clamping surface 102 faces radially outwardly with respect to the fastening member longitudinal axis F.

In accordance with some embodiments of the subject matter of the present application, the fastening member clamping portion 94 can include at least two fastening member clamping wings 100 which extend radially outwardly with respect to the fastening member longitudinal axis F. That is to say, the fastening member 92 can have a "bayonet" configuration. In this non-limiting example shown in the drawings, the fastening member clamping portion 94 can include exactly two fastening member clamping wings 100, diametrically opposed to each other about the fastening member longitudinal axis F.

In accordance with some embodiments of the subject matter of the present application, each fastening member clamping wing 100 can include two opposite wing side surfaces 104a, 104b which extend radially with respect to the fastening member longitudinal axis F. The two wing side surfaces 104a, 104b face away from each other. The fastening member clamping portion 94 can include at least two clamping surfaces 102, each clamping surface 102 being formed from a portion of a respective fastening member clamping wing 100. The clamping surface 102 can extend between the two wing side surfaces 104a, 104b.

The fastening member shank portion 98 includes a fastening member external thread 96. The fastening member external thread 96 has an external thread length LE, measured in a direction of the fastening member longitudinal F. In accordance with some embodiments of the subject matter of the present application, fastening member external thread 96 can be interrupted (i.e., non-continuous, not-shown).

In accordance with some embodiments of the subject matter of the present application, the fastening member shank portion 98 can include an elongated fastening member neck portion 99 which extends between the fastening member clamping portion 94 and the fastening member external thread 96. The fastening member neck portion 99 has a fastening member neck height N as measured in a direction along the fastening member longitudinal axis F. Unlike, for example U.S. Pat. No. 7,004,692, where the screw member has a hollow portion (formed from the though hole for providing coolant to coolant outlets), the fastening member 92 of the present invention is solid, in the sense there are no trough holes. Thus, the length of the fastening member 92 can be increased without risk of weakening. In this regard it is noted that the fastening member neck height N can be greater than the external thread length LE. In particular, the fastening member neck height N can be greater than twice the external thread length LE.

In accordance with some embodiments of the subject matter of the present application, the fastening member shank portion 98 can include at least two fastening member resilient pins 106 angularly spaced apart about the fastening member longitudinal axis F. The at least two fastening member resilient pins 106 are flexible in a radial direction. The at least two fastening member resilient pins 106 can be located at the rear end of the fastening member 92 and thus, be further from the fastening member clamping portion 94 than the fastening member external thread 96. The at least two fastening member resilient pins 106 can be spaced apart by a fastening member pin gap 108. In this non-limiting example shown in the drawings, the fastening member 92 include exactly two fastening member resilient pins 106, diametrically opposed to each other about the fastening member longitudinal axis F.

The rotary cutting tool 20 is adjustable between a released position and a locked position. In the released position of the rotary cutting tool 20, as shown in FIG. 2, the rotary cutting tool 20 is unassembled and the male coupling member 38 is located outside of the female coupling member 68.

Assembly of the rotary cutting tool 20 can be accomplished by performing the following steps. In accordance with a first method of assembly, the fastening member shank portion 98 is inserted into the female coupling member 68. The fastening member external thread 96 is turned in a rotationally rearward direction R_R within the holder internal thread 72, so that the fastening member external thread 96 and the holder internal thread 72 initially threadingly engage each other. In this position, for any and all fastening member clamping wings 100, one of the two opposite wing side surfaces 104a, 104b faces in the rotationally forward direction R_F. Next, the replaceable cutting head 22 is placed above the fastening member clamping portion 94 and is oriented so that the at least two through hole widenings 48 are aligned with the at least two fastening member clamping wings 100. Then, the replaceable cutting head 22 is moved towards tool holder 24, with the at least two fastening member clamping wings 100 passing through the at least two through hole widenings 48 allowing the male coupling member 38 to be inserted into the female coupling member 68, until the head abutment surface 54 comes into initial contact with the holder abutment surface 84. The replaceable cutting head 22 is rotated in a rotationally rearward direction R_R (optionally by a key—not shown) until each fastening member clamping wing 100 is located in a clamping wing pocket 50, and each rotationally rearward facing pocket side surface 53 abuts a respective rotationally forward facing wing side surface 104a. The replaceable cutting head 22 is rotated further and by virtue of each rotationally rearward facing pocket side surface 53 abutting a respective rotationally forward facing wing side surface 104a, the fastening member 92 also rotates, which in turn further threadingly engages the fastening member external thread 96 with the holder internal thread 72, drawing the fastening member 92 into the female coupling member 68 until each clamping surface 102 abuts a respective bearing surface 52. Further rotation of the replaceable cutting head 22 (and thus the fastening member 92) causes the fastening member 92 to urge the male coupling member 38 of the replaceable cutting head 22 into the female coupling member 68 of the tool holder 24 until the conical head abutment surface 54 abuts the conical forward holder abutment surface 84 and eventually a Morse taper coupling is formed between the male and female coupling members 38, 68, defining the locked position of the rotary cutting tool 22. As the male coupling member is urged into the female member, surface pressure between the two parts increases. The resulting friction prevents slippage so that the taper is self-holding. In this regard it is noted that (unlike, for example U.S. Pat. No. 7,004,692), there is no axial stopper which prevents insertion of the male coupling member 36 into the female coupling member 68. It is further noted that the fastening member 92 urges the male coupling member into the female member in a controlled, precise manner, unlike a hammer, for example.

In the locked position of the rotary cutting tool 20, the male coupling member 38 is removably retained in the female coupling member 68 by the fastening member 92 located in the head through hole 42. The fastening member external thread 96 and the holder internal thread 72 are threadingly engaged with each other. The head longitudinal axis A, the holder longitudinal axis C and the fastening member longitudinal axis F are all co-incident (i.e., aligned) with each other. In accordance with some embodiments of the subject matter of the present application, the at least one clamping surface 102 can abut the at least one bearing surface 52. The head base surface 40 can be spaced apart from the holder forward surface 70. That is do say, the head base surface 40 does not contact the holder forward surface 70. The at least two fastening member resilient pins 106 can be elastically deformed against the rearward holder abutment surface 88. In the "bayonet" configuration of the fastening member 92, each of the at least two clamping surfaces 102 can abut a respective bearing surface 52. Each rotationally rearward facing pocket side surface 53 of the at least two clamping wing pockets 50 can abut a respective rotationally forward facing wing side surface 104*a*.

Unlike U.S. Pat. No. 7,004,692, where the conical abutment surfaces are primarily for centering purposes, the conical abutment surfaces of the present invention provide the majority of torque transfer from the tool holder 24 to the cutting head 22 by virtue of Morse taper coupling. Consequently, less forces and stresses are applied to the fastening member (in particular, the fastening member clamping wings 100). This is in especially beneficial to rotary cutting tools having a small outer cutting diameter (i.e., equal or less than 7.6 mm), where the fastening member is correspondingly small which a) makes it more likely to break, b) is less effective for securing the head in the pocket, and c) is less effective at transferring torque to the head.

Although the subject matter of the present application has been described to a certain degree of particularity, it should be understood that various alterations and modifications could be made without departing from the spirit or scope of the invention as hereinafter claimed.

What is claimed is:

1. A replaceable cutting head (22), for rotary cutting operations, having a head longitudinal axis (A), defining opposite forward and rearward directions ($D_F$, $D_R$), and opposite rotationally forward and rearward directions ($R_F$, $R_R$) with the rotationally forward direction ($R_F$) being the cutting direction, the replaceable cutting head (22) comprising:

a forward portion forming a cutting portion (26) and a rearward portion forming a mounting portion (28); and opposite head forward and rearward surfaces (56, 58) and a head peripheral surface (60) extending therebetween, the head forward surface (56) being located at the cutting portion (26) and the head rear surface (58) being located at the mounting portion (28);

a head through hole (42) comprising a through hole peripheral surface (44) which extends about a through hole central axis (E), and intersects the head forward and rearward surfaces (56, 58); wherein:

the mounting portion (28) comprises a male coupling member (38) protruding rearwardly from a head base surface (40), the head base surface (40) extending transversely with respect to the head longitudinal axis (A), and defining a boundary between the cutting portion (26) and the mounting portion (28); and the male coupling member (38) comprises a conically shaped head abutment surface (54), the head abutment surface (54) tapering inwardly in the rearward direction (DR) at a head cone angle (2α) in the range of 2.8°≤2α≤3.16°, the head abutment surface (54) having a head cone height (H1) measured in a direction along the head longitudinal axis (A) and a maximum head cone diameter ($D_{max}$), the head cone height (H1) greater than the maximum head cone diameter ($D_{max}$), the male coupling member (38) configured for a Morse taper coupling mechanism.

2. The replaceable cutting head (22) according to claim 1, wherein the head cone angle (2α) is in the range of 2.9°≤2α≤3.06°.

3. The replaceable cutting head (22) according to claim 1, wherein:

the head through hole (42) comprises:

a clamping portion receiving portion (64) and a shank portion receiving portion (66) axially offset therefrom, the shank portion receiving portion (66) extending between the clamping portion receiving portion (64) and the head rearward surface (58); and the clamping portion receiving portion (64) comprises at least one bearing surface (52) tapering inwardly in the rearward direction ($D_R$).

4. The replaceable cutting head (22) according to claim 3, wherein:

the clamping portion receiving portion (64) extends to the head forward surface (56).

5. The replaceable cutting head (22) according to claim 3, wherein:

the head through hole (42) comprises at least two radially extending through hole widenings (48) extending from the head rearward surface (58) to the clamping portion receiving portion (64).

6. The replaceable cutting head (22) according to claim 5, wherein:

the clamping portion receiving portion (64) comprises:

at least two clamping wing pockets (50), each clamping wing pocket (50) merging with a respective through hole radial widening (48) and being rotationally forward therefrom about the head longitudinal axis (A); and at least two bearing surfaces (52), each bearing surface (52) being formed from a portion of a respective clamping wing pocket (50).

7. The replaceable cutting head (22) according to claim 6, wherein:

the head through hole (42) comprises exactly two through hole widenings (48) diametrically opposed to each other about the through hole central axis (E); and the clamping portion receiving portion (64) comprises exactly two clamping wing pockets (50) diametrically opposed to each other about the through hole central axis (E).

8. The replaceable cutting head (22) according to claim 1, wherein:

the head cone height (H1) is greater than 1.5 times the maximum head cone diameter ($D_{max}$).

9. The replaceable cutting head (22) according to claim 1, wherein:

the mounting portion (28) has a mounting portion height (H4) as measured between the head rearward surface (58) and the head base surface (40) in the direction along the head longitudinal axis (A); and the head cone height (H1) is greater than 80% of the mounting portion height (H4).

10. The replaceable cutting head (22) according to claim 9, wherein:

the cutting portion (26) has a cutting portion height (H2) as measured between the head forward surface (56) and the head base surface (40) in the direction along the head longitudinal axis (A); and the mounting portion height (H4) is greater than the cutting portion height (H2).

11. The replaceable cutting head (22) according to claim 10, wherein the mounting portion height (H4) is greater than twice the cutting portion height (H2).

12. The replaceable cutting head (22) according to claim 1, wherein the male coupling member (38) is devoid of an external thread and a tang and a square drive.

13. The replaceable cutting head (22) according to claim 1, wherein the head through hole (42) comprises at least one bearing surface (52) located entirely forward of the head base surface (40).

14. A tool holder (24), having a holder longitudinal axis (C), the tool holder (24) comprising:

a female coupling member (68) extending rearwardly from a holder forward surface (70), the holder forward surface (70) extending transversely with respect to the holder longitudinal axis (C), the female coupling member (68) comprising:

a conically shaped forward holder abutment surface (84) tapering inwardly in the rearward direction (DR) towards the holder internal thread (72) at a holder cone angle (2γ) in the range of 2.8°≤2γ≤3.16°, the forward holder abutment surface (84) has a holder cone height (H3 as measured in a direction along the holder longitudinal axis (C) and a maximum holder cone diameter (d*max*) and the holder cone height (H3) is greater than the maximum holder cone diameter (d*max*), the female coupling member (68) configured for a Morse taper coupling mechanism; and a holder internal thread (72) which is located rearward of the forward holder abutment surface (84).

15. The tool holder (24) according to claim 14, wherein the holder cone angle (2γ) is in the range of 2.9°≤2γ≤3.06°.

16. The tool holder (24) according to claim 14, wherein:

the tool holder (24) comprises:

a holder peripheral surface (74) extending about the holder longitudinal axis (C) and delimiting a boundary of the holder forward surface (70); and a coolant channel (79) opening out to the holder peripheral surface (74).

17. The tool holder (24) according to claim 16, wherein:

the holder peripheral surface (74) comprises a forward holder peripheral surface (76) and a rearward holder peripheral surface (78) and an intermediate holder peripheral surface (77) extending therebetween, the forward holder peripheral surface (76) being closer to the holder forward surface (70) than both the intermediate holder peripheral surface (77) and the rearward holder peripheral surface (78);

the forward holder peripheral surface (76) has a diameter less than the diameter of the rearward holder peripheral surface (78); and the coolant channel (79) opens out at least partially to the intermediate holder peripheral surface (77).

18. The tool holder (24) according to claim 16, further comprising a rearward supporting portion (82) having a rearward holder abutment surface (88) which extends about the holder longitudinal axis (C).

19. The tool holder (24) according to claim 14, wherein: the holder cone height (H3) is greater than 1.5 times the maximum holder cone diameter (d*max*).

20. The tool holder (24) according to claim 14, wherein:

the holder internal thread (72) has an internal thread length (LI) as measured in the direction along the holder longitudinal axis (C);

the internal thread length (LI) is less than the holder cone height (H3).

21. A rotary cutting tool (20) comprising:

a replaceable cutting head (22) in accordance with claim 1;

a tool holder (24) in accordance with claim 16; and a fastening member (92), elongated along a fastening member longitudinal axis (F), the fastening member (92) comprising a fastening member clamping portion (94) and a fastening member shank portion (98) axially offset therefrom along the fastening member longitudinal axis (F), the fastening member clamping portion (94) comprising a clamping surface (102) which tapers inwardly in a direction from the fastening member clamping portion (94) towards the fastening member shank portion (98), the fastening member shank portion (98) comprising a fastening member external thread (96); wherein:

the rotary cutting tool (20) is adjustable between a released position and a locked position, wherein in the locked position:

the male coupling member (38) is removably retained in the female coupling member (68) by the fastening member (92) located in the head through hole (42), the fastening member external thread (96) and the holder internal thread (72) being threadingly engaged with each other; and the head abutment surface (54) abuts the forward holder abutment surface (84), thereby forming a Morse taper coupling between the male and female coupling members (38, 68).

22. The rotary cutting tool (20) according to claim 21, wherein the head through hole (42) of the replaceable cutting head (22) comprises at least one bearing surface (52), in the locked position the at least one clamping surface (102) abuts the at least one bearing surface (52).

23. The rotary cutting tool (20) according to claim 21, wherein the fastening member (92) is integrally formed, having a unitary one-piece construction.

24. The rotary cutting tool (20) according to claim 21, wherein in the locked position the head base surface (40) is spaced apart from the holder forward surface (70).

25. The rotary cutting tool (20) according to claim 21, wherein the rotary cutting tool (20) is a reamer.

26. The rotary cutting tool (20) according to claim 21, wherein:

the head through hole (42) comprises at least two through hole widenings (48) extending from the head rearward surface (58) to the clamping portion receiving portion (64);

the clamping portion receiving portion (64) comprises:

at least two clamping wing pockets (50), each clamping wing pocket (50) merging with a respective through hole radial widening (48) and being rotationally forward therefrom about the head longitudinal axis (A); and at least two bearing surfaces (52), each bearing surface (52) being formed from a portion of a respective clamping wing pocket (50);

the fastening member clamping portion (94) comprises at least two fastening member clamping wings (100) which extend radially outwardly with respect to the fastening member longitudinal axis (F);

the fastening member clamping portion (94) comprises at least two clamping surfaces (102), each clamping surface (102) being formed from a portion of a respective fastening member clamping wings (100);

each of the at least two fastening member clamping wings (100) is located in a respective clamping wing pocket (50); and in the locked position:

each of the at least two clamping surfaces (102) abuts a respective bearing surface (52).

27. The rotary cutting tool (20) according to claim 26, wherein:

each of the at least two clamping wing pockets (50) comprises a pocket side surface (53) which extends radially with respect to the holder longitudinal axis (C) and faces in the rotationally rearward direction (R*R*);

each of the at least two fastening member clamping wings (100) comprises two opposite wing side surfaces (104*a*, 104b) which extend radially with respect to the fastening member longitudinal axis (F);

in the locked position:

for any and all fastening member clamping wings (100), one of the two opposite wing side surfaces (104*a*) faces in the rotationally forward direction (R$_F$); and each rotationally rearward facing pocket side surface (53) of the at least two clamping wing pockets (50) abuts a respective rotationally forward facing wing side surface (104*a*).

28. The rotary cutting tool (20) according to claim 26, wherein:

the fastening member shank portion (98) comprises an elongated fastening member neck portion (99) extending between the fastening member clamping portion (94) and the fastening member external thread (96);

the fastening member neck portion (99) has a fastening member neck height (N) as measured in a direction along the fastening member longitudinal axis (F);

the fastening member external thread (96) has an external thread length (LE) as measured in the direction along the fastening member longitudinal axis (F); and the fastening member neck height (N) is greater than the external thread length (LE).

29. The rotary cutting tool (20) according to claim 26, wherein:

the head through hole (42) comprises exactly two through hole widenings (48) diametrically opposed to each other about the through hole central axis (E); and the clamping portion receiving portion (64) comprises exactly two clamping wing pockets (50) diametrically opposed to each other about the through hole central axis (E); and the fastening member clamping portion (94) comprises exactly two fastening member clamping wings (100), diametrically opposed to each other about the fastening member longitudinal axis (F).

30. The rotary cutting tool (20) according to claim 26, wherein:

the tool holder (24) further comprises a rearward supporting portion (82) having a rearward holder abutment surface (88) which extends about the holder longitudinal axis (C);

the fastening member shank portion (98) comprises:

at least two fastening member resilient pins (106) angularly spaced apart about the fastening member longitudinal axis (F), the at least two fastening member resilient pins (106) being flexible in a radial direction and located further from the fastening member clamping portion (94) than the fastening member external thread (96); and in the locked position:

the at least two fastening member resilient pins (106) are elastically deformed against the rearward holder abutment surface (88).

* * * * *